United States Patent [19]

Layton

[11] Patent Number: 4,827,954
[45] Date of Patent: May 9, 1989

[54] AUTOMATED WORK TRANSFER SYSTEM HAVING AN ARTICULATED ARM

[75] Inventor: Howard M. Layton, New Fairfield, Conn.

[73] Assignee: Interlab, Inc., Danbury, Conn.

[21] Appl. No.: 640,113

[22] Filed: Aug. 13, 1984

Related U.S. Application Data

[63] Continuation-in-part of Ser. No. 443,894, Nov. 23, 1982, Pat. No. 4,466,454.

[51] Int. Cl.$^4$ .............................................. B08B 3/04
[52] U.S. Cl. ........................................ 134/76; 134/82; 134/140; 901/14; 414/750; 414/751; 414/744.3
[58] Field of Search ..................... 134/62, 76, 77, 78, 134/82, 134, 140; 414/222, 226.1, 744 R, 750, 751; 901/6, 14, 21

[56] References Cited

U.S. PATENT DOCUMENTS

| | | | |
|---|---|---|---|
| 3,255,893 | 6/1966 | Hainer et al. | 901/21 X |
| 3,268,091 | 8/1966 | Melton | 901/21 X |
| 3,335,839 | 8/1967 | Neumann | 134/76 X |
| 3,948,093 | 4/1976 | Folchi et al. | 73/862.04 |
| 4,014,495 | 3/1977 | Oda et al. | 901/6 X |
| 4,132,318 | 1/1979 | Wang et al. | 73/862.54 X |
| 4,177,002 | 12/1979 | Motoda et al. | 414/751 |
| 4,283,165 | 8/1981 | Vertut | 901/21 X |
| 4,305,130 | 12/1981 | Kelley et al. | 901/6 X |
| 4,370,091 | 1/1983 | Gagliardi | 414/4 X |
| 4,377,986 | 3/1983 | Juve | 134/76 X |
| 4,392,776 | 7/1983 | Shum | 901/21 X |
| 4,398,720 | 8/1983 | Jones et al. | 901/21 X |
| 4,501,522 | 2/1985 | Causer et al. | 414/4 |

OTHER PUBLICATIONS

Gasparri et al, "Automatic Robotic Computer-Controlled Batch Plating", IBM Technical Disclosure Bulletin, vol. 23, No. 10, Mar. 1981.

Primary Examiner—Frankie L. Stinson
Attorney, Agent, or Firm—Michael Ebert

[57] ABSTRACT

A work transfer system conveying a work basket in a programmed sequence to the processing tanks of an assembly thereof at various positions on a work bench. The system acts to transfer the basket to a selected tank and to properly orient the basket with respect to this tank before lowering the basket therein for processing for a given dwell period, at the conclusion of which the basket is hoisted from the tank and transferred to another tank where the procedure is repeated. Running parallel to the front side of the bench is a rail on which a robot rides, the robot supporting a hoist carriage which can be raised or lowered. Cantilevered from the carriage is a main arm articulated by an elbow shaft to a forearm that extends over the bench. The forearm is joined by a hand shaft depending therefrom to a hand that engages the handle of the work basket. A main arm motor acts to rotate the elbow shaft and thereby swing the forearm to a position generally aligning the basket with a selected tank therebelow. A forearm motor acts to turn the hand to properly orient the basket with respect to this tank before it is lowered therein by the hoist carriage.

4 Claims, 2 Drawing Sheets

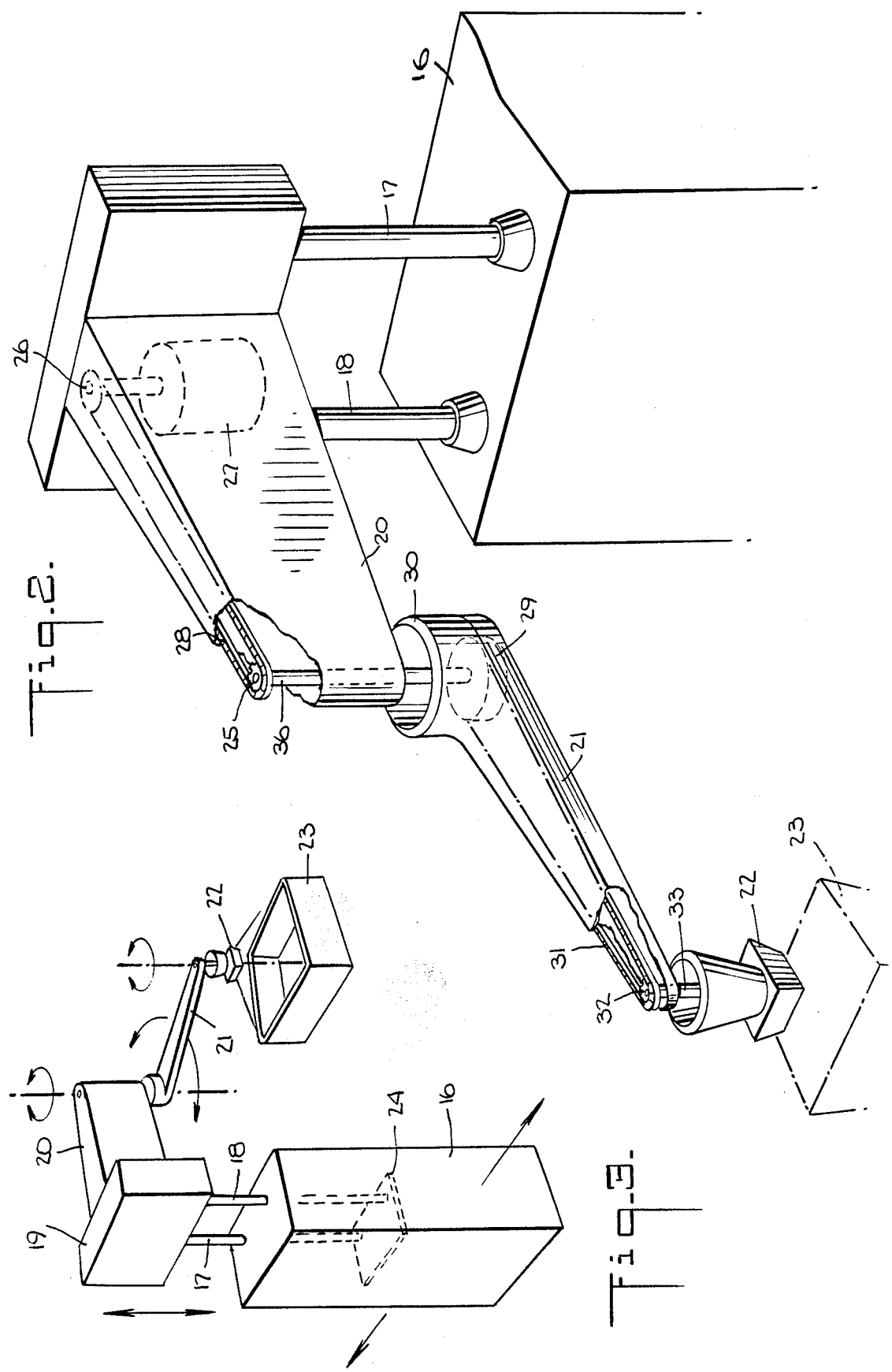

AUTOMATED WORK TRANSFER SYSTEM HAVING AN ARTICULATED ARM

Related Application

This application is a continuation-in-part of my copending application Ser. No. 443,894, filed Nov. 23, 1982, entitled "Automated Work Transfer System," now U.S. Pat. No. 4,466,454.

BACKGROUND OF INVENTION

1. Field of Invention

This invention relates generally to work transfer systems and more particularly to an automated system in which a robot running on a rail along the front side of a work bench having an assembly of processing tanks at various positions thereon, acts to convey a work basket in a programmed sequence to each of the tanks, the robot acting to properly orient the work basket with respect to each tank before the basket is immersed therein.

2. Prior Art

By using diffusion techniques it is now possible to fabricate transistors and diodes as well as resistors and capacitors within a single wafer of silicon to create integrated circuits. The manufacture of microelectronic devices entails sequences of photolithography, etching and critical cleaning processes. For the most part, these have heretofore been carried out manually at wet chemistry work benches. In the usual manufacturing procedure, batches of substrates or silicon wafers are carried in "boats" and transferred from one chemical tank to another by a human operator who adjusts the conditions prevailing in each tank and also determines the periods during which the boat dwells in the respective tanks for treatment therein.

While automated transfer operations are now commonplace in many industrial processes including electroplating, there are a number of practical factors which have heretofore militated against the introduction of automation in the processing of microelectronic devices. A major factor is that the value of the microelectronic devices is high relative to the cost of labor involved in making these parts. Thus the introduction of automated work transfer mechanisms to reduce labor costs may not be economically justified, particularly when one takes into account the capital investment dictated by automated equipment.

But other factors now come into play which have little to do with the cost effectiveness of replacing manual operations with automated work transfer mechanisms. As microelectronic devices become increasingly complex and sophisticated, the associated wet chemistry procedures are rendered even more critical. As a consequence, the variables and human errors incidental to manual operation can no longer be tolerated, for repeatability and consistency are now the primary desiderata. Hence, these considerations may override the cost effectiveness factor.

Though efforts have been made to automate work transfer operations in wet chemistry processing of microelectronic devices, they have had limited success, largely because of certain environmental problems. Many of the chemical processing tanks used in micro device and wafer processing act to discharge corrosive vapors into the work area in the region immediately above the process tanks. Since the hoist is for the most part required to operate within this corrosive environment, the freely moving, unanchored hoist type of work transfer mechanism such as are employed in the printed circuit board plating industry have not been readily adaptable to this very different and specialized type of use.

Instead, fixed-sequence transfer mechanisms have been quite widely used. These enjoy the advantage of lesser vulnerability to the corrosive environment by reason of the reduced complexity of that part of the mechanism which is exposed to the environment. However, they suffer from the limitation that work transfer takes place only between two immediately adjacent tanks. In general, a single, common processing cycle time must be used.

As a consequence, the corrosive nature of the environment associated with many of the wet chemistry processes in microelectronic device and wafer fabrication has hitherto tended to discourage the use of an unanchored, horizontally-free tracking hoist or robot in this industry.

In my above-identified copending application whose entire disclosure is incorporated herein by reference, a work transfer system is disclosed in which a robot is provided having a hand adapted to grasp the handle of the basket and to manipulate the basket in accordance with programmed instructions, whereby the basket may be made to carry work in any desired sequence along a row of processing tanks disposed on a work bench. In that system, the entire transfer mechanism, but for the robot and hand its supporting arms, lies outside of the corrosive environment and need not, therefore, be protected against corrosion.

In my prior transfer system, a rail is disposed adjacent the front side of the work bench in parallel relation to the uniform row of tanks thereon. Riding on this rail is a robot having a pair of vertical shafts extending upwardly therefrom, the shafts being supported on an elevator platform disposed within this robot. A pair of arms are cantilevered from the upper ends of these shafts, the arms extending over the work bench. The extremities of these arms are pivotally connected to a cross piece from whose center depends a rod terminating in a hand adapted to engage the handle of the work basket.

In operation, when the robot is instructed to carry the work basket to a selected tank, the robot is caused to travel on the rail to a position at which the hand and the basket borne thereby are in general alignment with this tank. At this point, the shafts are rotated to angle the cross piece and thereby turn the rod carrying the hand to orient the work basket so that it is properly oriented with respect to the selected tank therebelow. And by then operating the robot elevator, one may lower the work basket into the tank for processing, and later lift the basket from the tank, so that the basket can then be transferred to another processing tank on the work bench.

There are, however, some work bench tank set-ups for which my prior system is unsuited. Thus, where instead of a single uniform row of tanks as in my copending application, there is more than one row of such tanks on the bench; or where instead of a uniform row, the tanks are randomly dispersed or are not oriented in the same direction, the complex motions then required of the work transfer system to properly orient the basket with respect to a given tank cannot be executed.

In my prior system, the length of the cantilever arms cannot be automatically adjusted to effect a fore and aft movement of the work basket toward or away from either long side of the work bench. Thus if one tank is close to the robot which runs on a rail parallel to the front side of the bench and another tank is more distant from the robot, my prior system is incapable of transferring the basket from the first to the second tank.

SUMMARY OF INVENTION

In view of the foregoing, the main object of this invention is to provide an improved automated work transfer system for conveying a basket carrying work over a work bench having an assembly of processing tanks at various positions thereon, and for properly orienting the basket with respect to each tank in which the basket is to be immersed.

While the invention will be described in the context of a corrosion-resistant system which includes a robot operating outside of the corrosive environment, it will be appreciated that a similar transfer mechanism may be used in other applications not involving a corrosive environment.

More specifically, an object of the invention is to provide a system of the above type in which fore and aft movement of the work basket is made possible as well as movement in the horizontal and vertical directions, so that the system is capable of properly positioning the basket with respect to any tank in the assembly, regardless of its orientation on the work bench.

Also an object of this invention is to provide a system of the above type which operates efficiently and reliably, and which can be manufactured at relatively low cost.

Briefly stated, these objects are attained in a work transfer system conveying a work basket in a programmed sequence to the processing tanks of an assembly thereof at various positions on a work bench. The system acts to transfer the basket to a selected tank and to properly orient the basket with respect to this tank before lowering the basket therein for processing for a given dwell period, at the conclusion of which the basket is hoisted from the tank and transferred to another tank where the procedure is repeated.

Running parallel to the front side of the bench is a rail on which a robot rides, the robot supporting a hoist carriage which can be raised or lowered. Cantilevered from the carriage is a main arm articulated by an elbow shaft to a forearm that extends over the bench. The forearm is joined by a hand shaft depending therefrom to a hand that engages the handle of the work basket. A main arm motor acts to rotate the elbow shaft and thereby swing the forearm to a position generally aligning the basket with a selected tank therebelow. A forearm motor acts to turn the hand to properly orient the basket with respect to this tank before it is lowered therein by the hoist carriage.

OUTLINE OF DRAWINGS

For a better understanding of the invention as well as other objects and further features thereof, reference is made to the following detailed description to be read in conjunction with the accompanying drawings, wherein:

FIG. 2 is a perspective view of the robot; and

Figure 1:
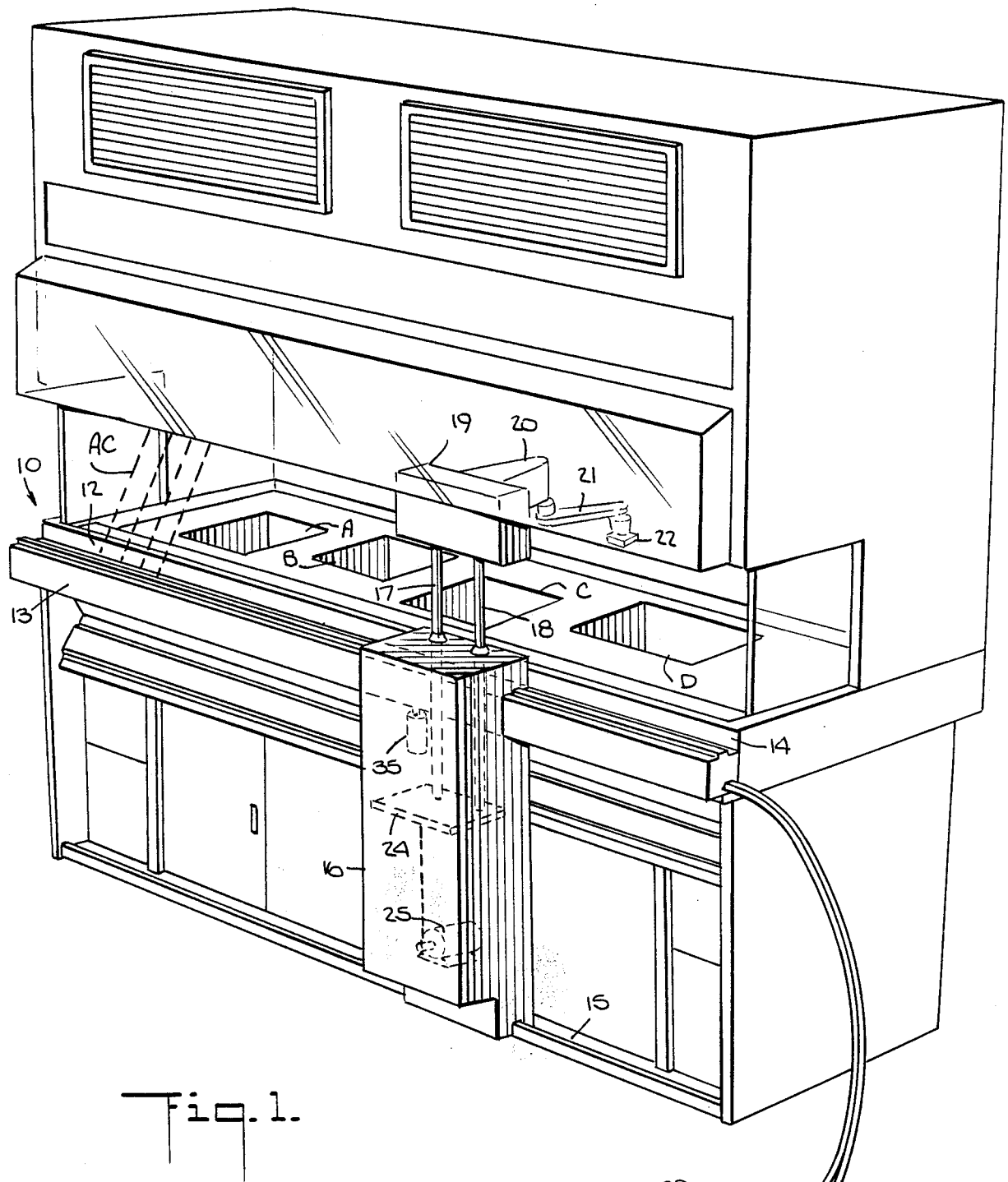
FIG. 1 is a perspective view of a typical wet chemistry work station which incorporates an automated work transfer system having a robot in accordance with the invention.

FIG. 3 schematically illustrates the motions executed by the robot in orienting the work basket.

DESCRIPTION OF INVENTION

The General Arrangement

Referring now to FIG. 1, where is shown a wet chemistry work station provided with a work bench 10 of conventional design on which is an assembly of chemical processing tanks A, B, C, and D, each tank being adapted to receive a basket carrying the work to be processed. The number of tanks and the nature of the chemical processing, and its operating sequence form no part of the present invention.

Because of vapors emitted from the tanks, the atmosphere in the region above the tanks is corrosive. This region is isolated from the external environment by a vertical air curtain AC created by a high velocity laminar air stream projecting downwardly from a transparent front hood 11 into an exhaust slot 12 extending along the front of the bench. This air curtain effectively isolates the contaminated work environment from the external environment.

The invention is operable with any isolating air curtain such as that existing in a typical fume exhaust hood in which openings and the rear of the work station have the effect of drawing all air from the work environment into rear exhaust slots and ducts, this air in turn being replaced by a stream of air drawn from in front of the station to create an air curtain thereacross. A significant feature of the present invention is that all components of the work transfer system lie within the external atmosphere except the hoist carriage and the articulated arm cantilevered therefrom which support a hand holding the work basket. Because only these components are exposed to a corrosive atmosphere, they may be made of a non-reactive metal such as titanium or of stainless steel clad with a protective plastic coating, such as Teflon (PTFE).

The system includes a supporting rail 13 secured to the upper edge 14 on the front side of the work bench so that the rail is outside air curtain AC and is laterally displaced from the assembly of tanks, the rail running parallel to the front side. Mounted against the front lower edge of the work bench is a guide rail 15.

Riding along these rails is a robot 16 which is fully encased but for a pair of hoisting posts 17 and 18 held in slide bearings and extending above the top of the robot to support a hoist carriage 19. Cantilevered from carriage 19 is a hollow main arm 20 articulated to a hollow forearm 21 from which a hand 22 depends to grasp the handle of a work basket 23. The posts 17 and 18 are anchored within the robot on an elevator platform 24 operated by an elevator motor 25 which acts to raise or lower the hoist carriage. A separate motor 35 on the robot acts to advance robot 16 along its supporting rail 13 to bring hand 22 in general alignment with a selected tank on the work bench.

As best seen in FIG. 2, main arm 20 is articulated to forearm 21 by means of a vertical elbow shaft 36 having a sprocket wheel 25 at its upper end. This wheel is linked to a sprocket wheel 26 on the shaft of a drive motor 27 housed within the main arm 20 by means of an endless sprocket chain 28. The hoisting posts 17 and 18 are hollow to accommodate power lines extending from the robot to the drive motor 27 in the main arm 20 as well as to a drive motor 29 housed in the hollow forearm.

The elbow shaft 36, which is hollow to accommodate electrical lines, extends into the forearm through a particle catcher cup 30 concentric with the shaft. This cup acts to pick up airborne particles that would otherwise fall onto the work bench therebelow. Drive motor 29 is coupled by an endless sprocket chain 31 to the sprocket wheel 32 at the upper end of a hollow hand shaft 33 which depends from the extremity of the forearm 21 and terminates in the hoist hand 22. In practice, the hand may be in the form of a permanent magnet to engage the ferromagnetic handle of the work basket 23. The reason shaft 33 is hollow is to permit the passage of electrical leads therethrough into the work basket for those situations in which a voltage is to be applied thereto. Hand shaft 33 passes through a particle catcher cup 34.

Thus, associated with the robot of the transfer system is an elevated motor 25 to raise or lower the hoist carriage, a rail motor 35 to advance the robot along the rail, a main arm motor 27 to turn the elbow shaft to cause the forearm to swing within an arc to position the basket fore and aft, and a forearm motor 29 to rotate hand shaft 33 to orient the basket-holding hand 22.

All of these motors are under the control of a programmable microcomputer 37 and a power supply 38. These may be mounted on the console of a work bench, or, as shown, be placed at a remote location.

Thus if in a given procedure, the work basket must first be immersed in tank A for five minutes, followed by sequential immersion in tanks B and C for eight minutes, after which the basket is immersed in tanks D for ten minutes, and the basket is to occupy particular positions in the tanks, the program set up for this treatment is such as to cause the motors to make the number of revolutions or fractions thereof necessary to exactly execute the desired program. The program may also take into account process variables, such as fluctuations in the temperature of the bath within a tank which may be sensed to vary the dwell period. In practice, the computer may be provided with program cards to supply the necessary instructions for different predetermined programs, or with a keyboard for entering new programs or modifying existing programs.

As shown in FIG. 3, when robot 16 is instructed by the computer to transfer a work basket from one processing tank in which it is immersed to another tank, the hoist carriage 19 is raised by elevator platform 24 to lift the work basket 23 from the tank. Then the robot is advanced to the left or right on rail 13, depending on where the next tank is, to a position generally in line with that tank, which in practice may be nearer or farther on the work bench in the transverse direction from the previous tank.

In order, therefore, to make the necessary fore and aft adjustment, the forearm 21 is swung to a position in line with the tank. And to properly orient the basket with respect to the tank, hand 22 is rotated to a position effecting the desired orientation.

While there has been shown and described a preferred embodiment of an AUTOMATED WORK TRANSFER SYSTEM HAVING AN ARTICULATED ARM in accordance with the invention, it will be appreciated that many changes and modifications may be made therein without, however, departing from the essential spirit thereof. Thus, instead of corrosion resistant metal parts as disclosed previously, the materials exposed to the corrosive environment are preferably non-metallic. Thus, one may fabricate the housings of the articulated arm and hand from polyvinylidene fluoride (PVDF) or from polyvinyl chloride (PVC). The required chains and sprockets are available commercially in PVDF material, and means could also be provided to seal and purge the housing for the small motor used to rotate the hand.

I claim:

1. A work transfer system for conveying in a desired sequence a work basket having a handle to a plurality of processing tanks so dispersed on a work bench that not all tanks are displaced the same transverse distance from the front side of the bench, nor are all tanks oriented in the same manner, said system comprising:
   A. a robot riding on a fixed rail parallel to the front side of the bench;
   B. a hoist carriage mounted above the robot, and means to raise or lower said carriage relative to the robot, said means being constituted by an elevator platform in said robot, a hoist post anchored on said platform to support the carriage, and an elevator motor to operate the platform;
   C. a main arm cantilevered from the carriage and articulated by a vertical elbow shaft to a forearm which extends over the bench, whereby said forearm is swingable in a horizontal plane, said forearm having a hand depending from its end and coupled thereto by a vertical hand shaft at right angles to the horizontal plane that engages the handle of the basket;
   D. means to advance the robot on the rail to a position in general alignment with a selected tank;
   E. means including a first drive motor disposed in said main arm and operatively coupled by an endless belt to said elbow shaft to swing the forearm relative to the main arm to shift the position of the basket so that it is transversely aligned with the selected tank therebelow on the workbench;
   F. a second drive motor disposed in said forearm and operatively coupled by an endless belt to the vertical handshaft to turn the hand to conform the orientation of the basket to that of the selected tank therebelow; and
   G. means to lower the hoist carriage to immerse the basket in the selected tank for processing therein, and for thereafter raising the basket preparatory to transfer of the basket to another tank where the procedure is repeated.

2. A work transfer system as set forth in claim 1, wherein said means to advance said robot on said rail includes a robot motor.

3. A system as set forth in claim 2, wherein said post and said elbow shaft are hollow to accommodate wires from said first and second drive motors to a power source therefor.

4. A system as set forth in claim 2, wherein said drive motors, said elevator motor and said robot motor are coupled to a computer which is programmed to govern the operation of these motors to effect transfer in a desired sequence.

* * * * *